(12) United States Patent
Lucia et al.

(10) Patent No.: US 12,271,671 B2
(45) Date of Patent: Apr. 8, 2025

(54) GENERATION FRAMEWORK FOR ULTRA-LOW POWER CGRAS

(71) Applicant: CARNEGIE MELLON UNIVERSITY, Pittsburgh, PA (US)

(72) Inventors: Brandon Lucia, Pittsburgh, PA (US); Nathan Beckmann, Pittsburgh, PA (US); Graham Gobieski, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 645 days.

(21) Appl. No.: 17/572,925

(22) Filed: Jan. 11, 2022

(65) Prior Publication Data

US 2022/0244965 A1 Aug. 4, 2022

Related U.S. Application Data

(60) Provisional application No. 63/228,184, filed on Aug. 2, 2021, provisional application No. 63/143,061, filed on Jan. 29, 2021.

(51) Int. Cl.
| | |
|---|---|
| G06F 30/30 | (2020.01) |
| G06F 30/327 | (2020.01) |
| G06F 30/34 | (2020.01) |
| G06F 15/78 | (2006.01) |
| G06F 111/16 | (2020.01) |
| G06F 115/02 | (2020.01) |

(52) U.S. Cl.
CPC ............ *G06F 30/34* (2020.01); *G06F 30/327* (2020.01); *G06F 15/7825* (2013.01); *G06F 2111/16* (2020.01); *G06F 2115/02* (2020.01)

(58) Field of Classification Search
None
See application file for complete search history.

(56) References Cited

PUBLICATIONS

J. Balfour et al., "An Energy-Efficient Processor Architecture for Embedded Systems," IEEE Computer Architecture Letters, vol. 7, No. 1, Jan.-Jun. 2008, pp. 29-32. (Year: 2008).*
V. Govindaraju et al., "DySER: Unifying Functionality and Parallelism Specialization for Energy-Efficient Computing," IEEE Computer Society, Sep./Oct. 2012, pp. 38-51. (Year: 2012).*
R. Prabhakar et al., "Plasticine: A Reconfigurable Architecture for Parallel Patterns," ACM ISCA'17, Jun. 24-28, 2017, Toronto, ON, Canada, pp. 389-402. (Year: 2017).*
T. Nowatzki et al., "Stream-Dataflow Acceleration," ACM ISCA'17, Jun. 24-28, 2017, Toronto, ON, Canada, pp. 416-429. (Year: 2017).*

(Continued)

*Primary Examiner* — Leigh M Garbowski
(74) *Attorney, Agent, or Firm* — KDW Firm PLLC

(57) ABSTRACT

Disclosed herein is a framework to generate ULP, energy-minimal coarse-grain reconfigurable arrays that execute in a spatial vector-dataflow fashion, mapping a dataflow graph spatially across a fabric of processing elements, applying the same DFG to many input data values, and routing intermediate values directly from producers to consumers. The spatial vector-dataflow minimizes instruction and data-movement energy and also eliminates unnecessary a switching activity because operations do not share execution hardware.

20 Claims, 4 Drawing Sheets

(56) References Cited

PUBLICATIONS

G. Gobieski et al., "Manic: A Vector-Dataflow Architecture for Ultra-Low-Power Embedded Systems," Micro-52, Oct. 12-16, 2019, Columbus, OH, USA, ACM, ages 670-684. (Year: 2019).*

N. Agarwal et al., "UDIR: Towards a Unified Compiler Framework for Reconfigurable Dataflow Architectures," IEEE Computer Architecture Letter, vol. 23, No. 1, Jan.-Jun. 2024, Date of publication Dec. 13, 2023, pp. 99-103. (Year: 2023).*

* cited by examiner

GENERATION FRAMEWORK FOR ULTRA-LOW POWER CGRAS

RELATED APPLICATIONS

This application claims the benefit of U.S. Provisional Patent Applications Nos. 63/143,061, filed Jan. 29, 2021, and 63/228,184, filed Aug. 2, 2021, the contents of which are incorporated herein in their entireties.

GOVERNMENT INTEREST

This invention was made with United States government support under CCF1815882 awarded by the National Science Foundation. The U.S. government has certain rights in the invention.

BACKGROUND

Ultra-low-power embedded systems operate in a wide range of environments without access to the power grid. These devices rely on batteries and/or energy harvested from the environment to power their sensors, processors, and radios. Energy efficiency is the primary determinant of end-to-end system performance in these embedded systems.

Tiny, ultra-low-power (ULP) sensor devices are becoming increasingly pervasive, sophisticated, and important to a number of emerging application domains. These include environmental sensing, civil-infrastructure monitoring, and chip-scale satellites. Communication consumes lots of energy in these applications, so there is a strong incentive to push ever-more computation onto the sensor device.

The opportunity for tiny, ULP devices is enormous. These types of embedded systems can be deployed to a wide range of environments, including harsh environments like the ocean or space. Sensors on board these devices produce rich data sets that require sophisticated processing. Machine learning and advanced digital signal processing are becoming important tools for applications deployed on ULP sensor devices.

This increased need for processing is in tension with the ULP domain. The main constraint these systems face is severely limited energy, either due to small batteries or weak energy harvesting. One possible solution is to offload processing toa more powerful edge device. However, communication takes much more energy than local computation or storage. The only viable solution is therefore to process data locally and transmit only a minimum of filtered/preprocessed data, discarding the rest. This operating model has a major implication: the capability of future ULP embedded systems will depend largely on the energy-efficiency of the onboard computing resources.

For battery-powereddevices, energy efficiency determines device lifetime. Once a single-charge battery has been depleted, the device is dead. Rechargeable batteries are limited in the number of recharge cycles, and even a simple data-logging application can exhaust a battery in just a few years.

For energy-harvesting devices, energy efficiency determines device performance. These devices generate energy and store the energy in a capacitor. Such devices spend most of their time powered off, waiting for the capacitor to recharge.

Often, ULP embedded systems include low-power radios that can be used to transmit data for off-board processing. However, this is not an efficient use of energy by the ULP device. Communication over long distances bears a high energy and time cost. Instead, energy is better spent doing as much onboard computation as possible (e.g., on-device machine inference), and then relaying only the minimal amount of processed (e.g., filtered or compressed) data.

Commercial-off-the-shelf (COTS) ULP devices are general-purpose and highly programmable, but this flexibility comes with an associated high energy cost. I Instruction and data-movement energy accounts for the majority of wasted energy in COTS devices. Eliminating these overheads can reduce energy requirements by nearly half, proving that, despite their low operating power, existing ULP designs are not energy-minimal.

For any application, a custom ASIC can minimize energy consumption. For example, extreme energy efficiency on neural networks can be achieved when all hardware is specialized. However, this efficiency comes at high upfront cost and with severely limited application scope. Applications in the ULP sensing domain are still evolving, increasing the risk that an ASIC will quickly become obsolete. Moreover, cost is a major consideration in these applications, making ASIC development even harder to justify.

Designing for energy-minimal, ULP operation is different than designing for other domains. This is partly because the ULP domain is at such a radically different scale that small changes have an outsized impact, but also because prioritizing energy over area and performance opens up new design tradeoffs. Unfortunately, existing ULP devices are not energy-minimal, and prior research has only begun to understand and address their sources of inefficiency. Widely available ULP computing platforms are fundamentally inefficient and needlessly limit applications. Therefore, new architectures are needed with a strong focus on ULP (e.g., <1 mW), energy-minimal operation.

SUMMARY

The disclosed invention addresses the energy-efficiency shortcomings of prior designs while maintaining a high degree of design flexibility and ease of programmability. The solution of the disclosed invention is a simple network of arbitrary functional units (referred to herein as "SNAFU"), which is a framework to generate ULP, energy-minimal coarse-grain reconfigurable arrays (CGRAs). SNAFU CGRAs execute in a spatial vector-dataflow fashion, mapping a dataflow graph (DFG) spatially across a fabric of processing elements (PEs), applying the same DFG to many input data values, and routing intermediate values directly from producers to consumers. The spatial vector-dataflow minimizes instruction and data-movement energy and also eliminates unnecessary a switching activity because operations do not share execution hardware.

A CGRA comprises a set of processing elements connected to each other via an on-chip network. These architectures are coarse in that the PEs support higher-level operations, like multiplication, on multi-bit data words, as opposed to bit-level configurability in FPGAs. They are also reconfigurable in that the PEs can often be configured to perform different operations and the on-chip network ("Network-on-Chip", referred to herein as "NoC") can be configured to route values directly between PEs. This lets applications map a dataflow graph onto the CGRA fabric (e.g., the body of a frequently executed loop). Many CGRAs also support SIMD operation, amortizing the cost of (re) configuration across many invocations. As a result, CGRAs can approach ASIC-like energy-efficiency and performance.

The major difference between SNAFU and most prior art CGRAs is the extreme design point. SNAFU operates at orders-of-magnitude lower energy and power budget, demanding an exclusive focus on energy-minimal design. SNAFU is designed from the ground up to minimize energy, even at the cost of area or performance. For example, SNAFU schedules only one operation per PE, which minimizes switching activity (energy) but increases the number of PEs needed (area). As a result of such design choices, SNAFU comes within 2.6× ASIC energy efficiency while remaining fully programmable.

SNAFU generates ULP CGRAs from a high-level description of available PEs and the fabric topology. SNAFU defines a standard interface that lets designers "bring your own function unit" and easily integrate it into a ULP CGRA, along with a library of common PEs. The SNAFU framework schedules operation execution and routes intermediate values to dependent operations while consuming minimal energy. SNAFU includes a compiler that maps vectorized C-code to efficient CGRA bitstreams and reduces design effort of tape-out via top-down synthesis of CGRAs.

SNAFU is the first flexible CGRA-generator for ULP, energy-minimal systems. SNAFU makes it easy to integrate new functional units, compile programs to energy-efficient bitstreams, and produce tape-out-ready hardware. Key design choices in SNAFU minimize energy: scheduling at most one operation per PE; asynchronous dataflow without tag-token matching; statically routed, bufferless, multi-hop NoC; and producer-side buffering of intermediate values.

Also included herein is an exemplary description of a complete ULP system-on-chip with a CGRA fabric, RISC-V scalar core, and memory (referred to herein as SNAFU-ARCH). SNAFU-ARCH is implemented in an industrial sub-28 nm FinFET process with compiled memories. SNAFU-ARCH operates at <1 mW at 50 MHz, reduces energy by 81% versus a scalar core and 41% vs. MANIC (an architecture using the vector-dataflow execution model) and improves performance by 9.9× versus a scalar core and 4.4× vs. MANIC.

Energy-minimal designs can save energy by making tradeoffs that are unattractive in traditional designs. SNAFU realizes this opportunity primarily by trading area for energy: SNAFU-ARCH consumes 41% less energy than MANIC but is 1.8× larger. Thus, the overriding goal of this invention is to maximize end-to-end device capability by minimizing the energy of onboard computing. This goal is a big change from the typical goal of maximizing performance under a power or area envelope, and it leads SNAFU to a different design point that prioritizes energy efficiency over other metrics.

SNAFU is a framework for generating energy-minimal, ULP CGRAs and compiling applications to run efficiently on them. SNAFU-ARCH is a complete ULP system featuring a CGRA generated by SNAFU, a scalar core, and memory.

DETAILED DESCRIPTION

Figure 1:
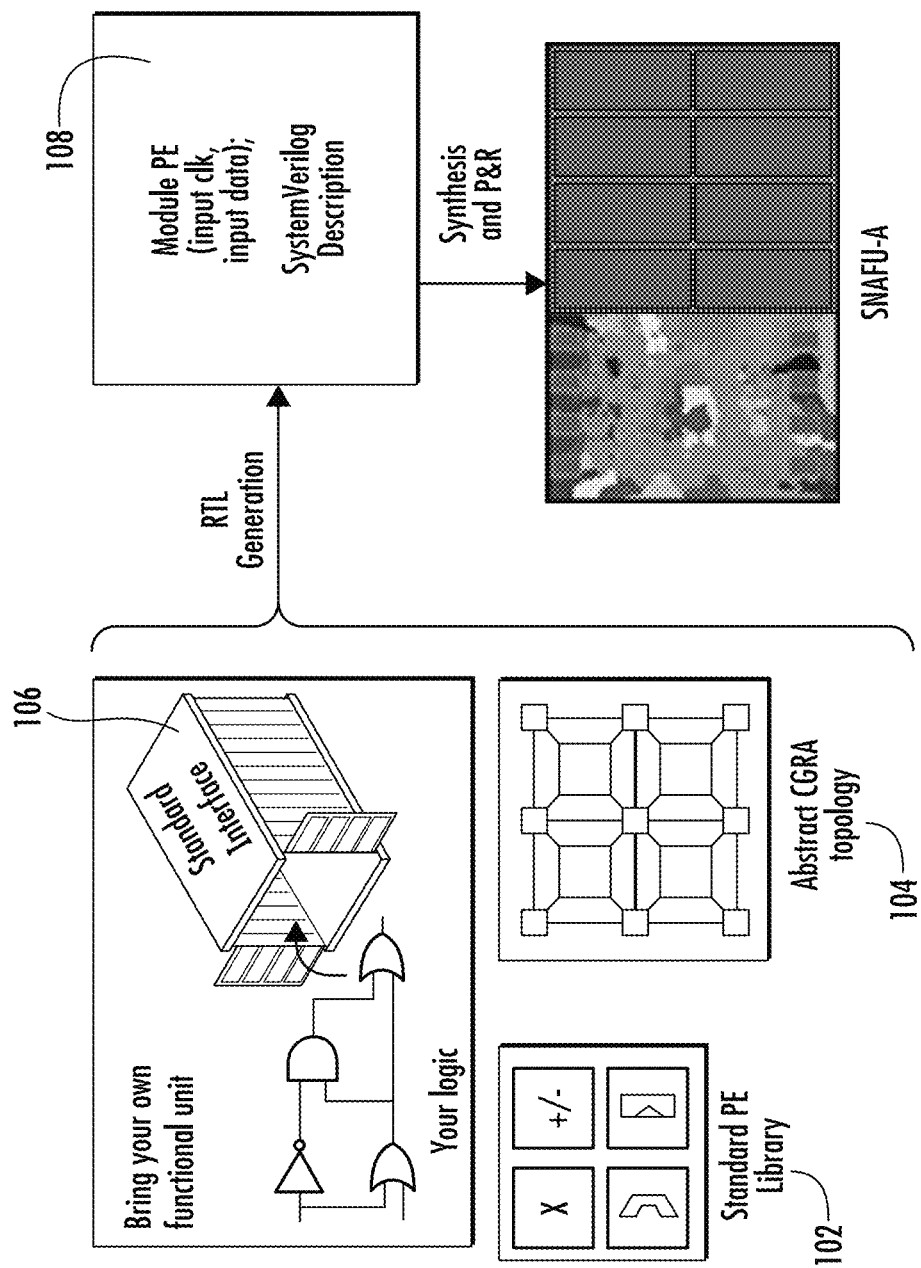
FIG. 1 is a block diagram showing the workflow of SNAFU, showing the "bring your own functional unit" approach which allows easy integration of custom logic tailored for specific domains.

SNAFU is a general and flexible framework for converting a high-level description of a CGRA to valid register transfer logic (RTL) and ultimately to ULP hardware. FIG. 1 shows SNAFU's workflow. SNAFU takes two inputs: a library of processing elements (PEs) 102 and a high-level description of the CGRA topology 104. SNAFU lets designers customize the ULP CGRA via a "bring your own functional unit" approach, defining a standard interface 106 that makes it easy to add custom logic to a generated CGRA.

With these inputs, SNAFU generates complete RTL 108 for the CGRA. RTL 108 includes a statically routed, bufferless, multi-hop on-chip network parameterized by the topology description 104. It also includes hardware to handle variable-latency timing and asynchronous dataflow firing. Finally, SNAFU simplifies hardware generation by supporting top-down synthesis, making it easy to go from a high-level CGRA description to a placed-and-routed ULP design ready for tape out.

Figure 2:
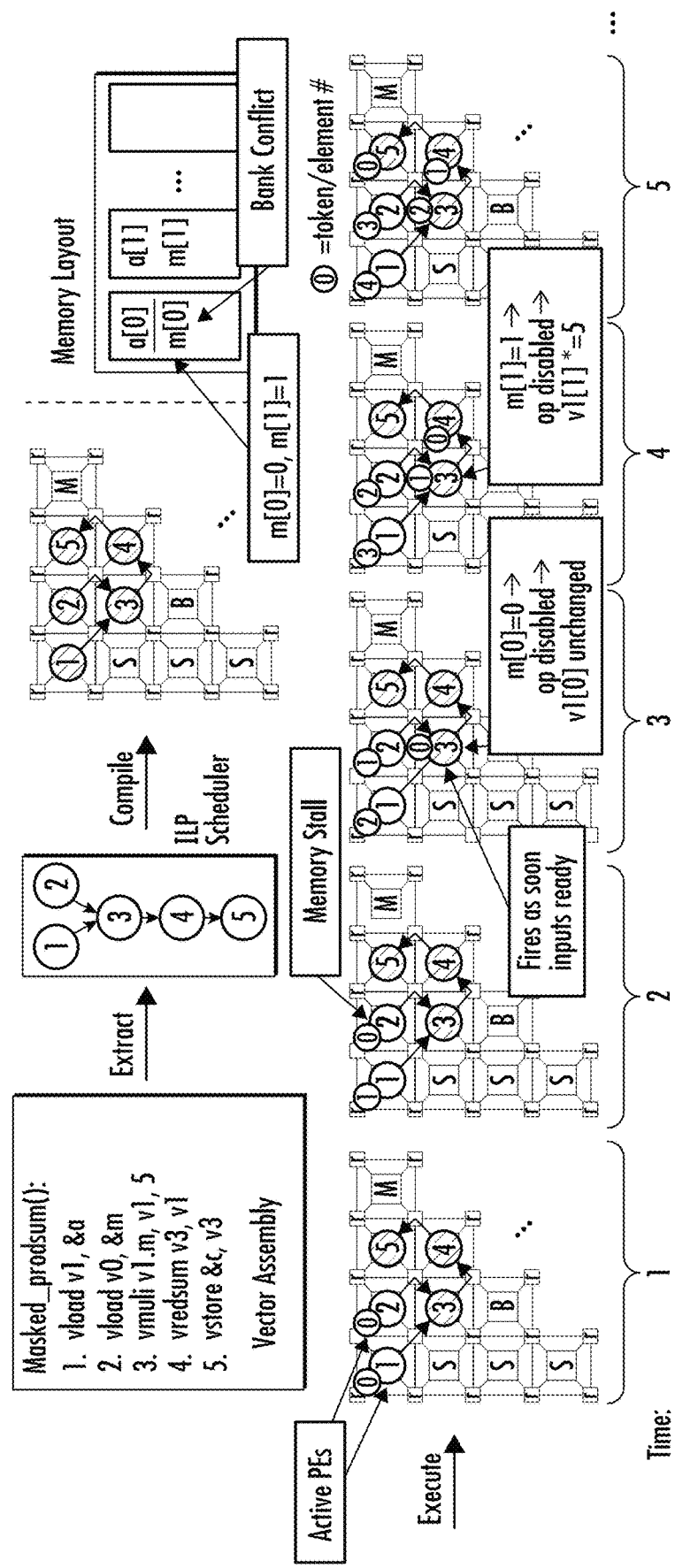
FIG. 2 is a block diagram showing an exemplary execution on a SNAFU CGRA fabric. The DFG is extracted from vectorized C-code, compiled to a bitstream and executed according to asynchronous dataflow firing.

FIG. 2 shows the workflow to take a simple vectorized kernel and execute it on a ULP CGRA generated by SNAFU. This kernel multiplies values at address "&a" by 5 for the elements where the mask m is set, sums the result, and stores it to address "&c". SNAFU's compiler extracts the dataflow from the kernel source code and generates a bitstream to configure the CGRA fabric. The scalar core configures the CGRA fabric and kicks off fabric execution using three new instructions (vcfg, vtfr, vfence), after which the CGRA runs autonomously in SIMD fashion over arbitrarily many input data values. The fabric executes the kernel using asynchronous dataflow firing:

In timestep 1, the two memory PEs (that load $a[0]$ and $m[0]$) are enabled and issue loads. The rest of the fabric is idle because it has no valid input values.

In timestep 2, the load for $a[0]$ completes, but the load for $m[0]$ cannot complete due to a bank conflict. This causes a stall, which is handled transparently by SNAFU's scheduling logic and bufferless NoC. Meanwhile, the load of $a[1]$ begins.

In timestep 3, as soon as the load for $m[0]$ completes, the multiply operation can fire because both of its inputs have arrived. But $m[0]==0$, meaning the multiply is disabled, so $a[0]$ passes through transparently. The load of $a[1]$ completes and loads for $a[2]$ and $m[1]$ begin.

In timestep 4, when the predicated multiply completes, its result is consumed by the fourth PE, which keeps a partial sum of the products. The preceding PEs continue executing in pipelined fashion, multiplying $a[1]\times 5$ (because $m[1]==1$) and loading $a[3]$ and $m[2]$.

In timestep 5, a value arrives at the fifth PE, and is stored back to memory in $c[0]$. Execution continues in this fashion until all elements of a and m have been processed and a final result has been stored back to memory.

Goal: Maximizing Flexibility

SNAFU is designed to generate CGRAs that minimize energy, maximize extensibility, and simplify programming. For the architect, SNAFU automates synthesis from the top down and provides a "bring your own functional unit"

standard interface 106, allowing easy integration of custom functional units (FUs) into a CGRA. For the application programmer, SNAFU is designed to efficiently support SIMD execution of vectorized RISC-V C-code, using a custom compiler that targets the generated CGRA.

Figure 3:
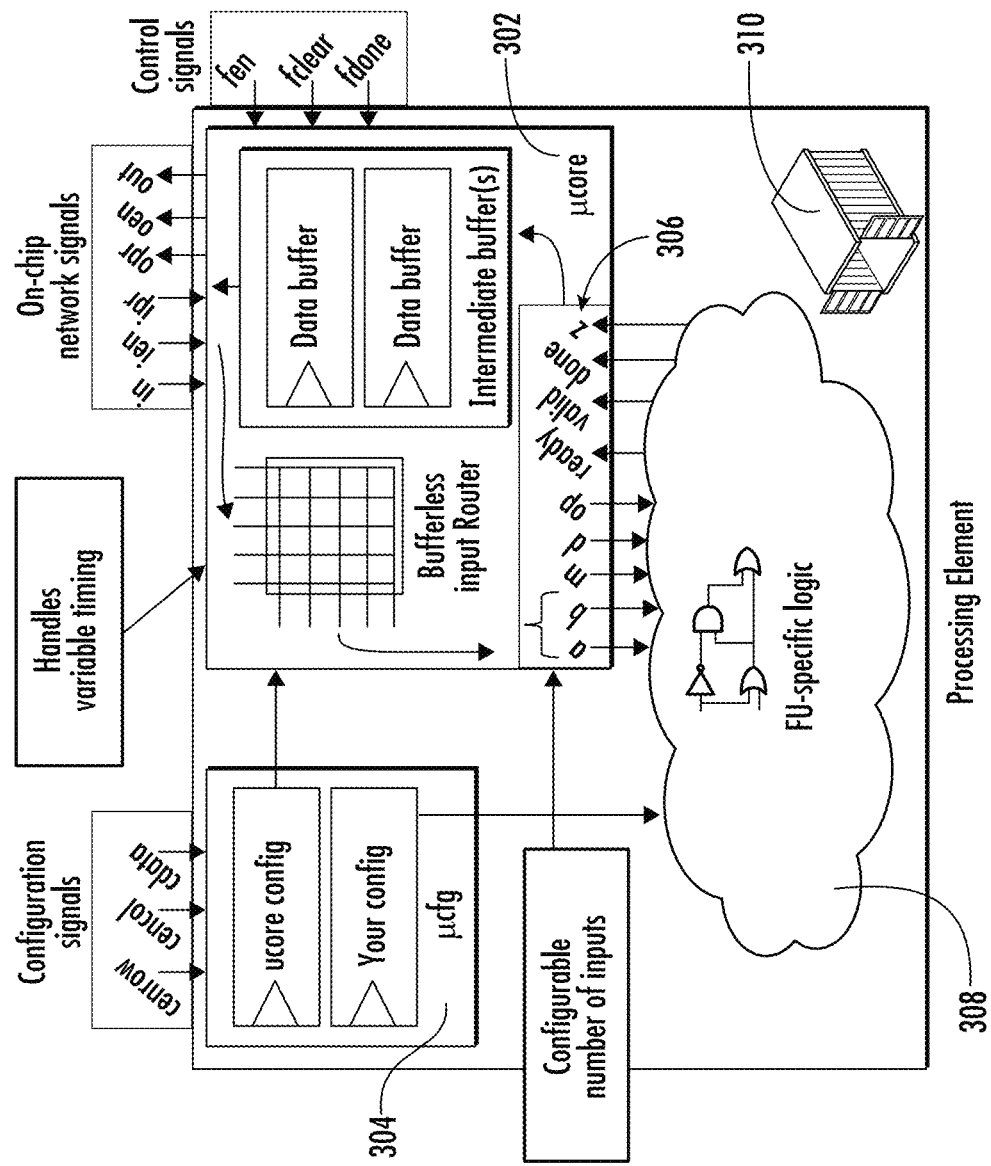
FIG. 3 is a block diagram showing the microarchitecture of a generic SNAFU processing element, comprising two components: μcore and μcfg.

Bring Your Own Functional Units—SNAFU has a generic PE microarchitecture that exposes a standard interface 106, enabling easy integration of custom FUs into the CGRA. If a custom FU implements SNAFU's interface, then SNAFU generates hardware to automatically handle configuring the FU, tracking FU and overall CGRA progress, and moderating its communication with other PEs. There are few limitations on the sort of the logic that SNAFU can integrate. SNAFU's standard interface 106 is designed to support variable latency and currently supports up to four inputs but could easily be extended to support more inputs. The PE can have any number of additional ports and contain any amount of internal state FIG. 3 shows the microarchitecture of a generic SNAFU processing element, comprising two components: µcore 302 and µcfg 304. The µcore 302 handles progress tracking, predicated execution, and communication. The standard interface 106 connects the µcore 302 to the custom FU logic 308. The µcfg 304 handles the configuration or reconfiguration of both the µcore 302 and FU 308s.

The µcore 302 handles communication between the processing element and the NoC, decoupling the NoC from the FU 308. The µcore 302 is made up of an input router, logic that tracks when operands are ready, and a few buffers for intermediate values. The input router handles incoming connections, notifying the internal logic of µcore 302 of the availability of valid data and predicates. The intermediate buffers hold output data produced by the FU 308. Before an FU 308 (that produces output) fires, the µcore 302 first allocates space in the intermediate buffers. Then, when the FU 308 completes, its output data is written to the allotted space, unless the predicate value is not set, in which case a fallback value is passed through (as described below). Finally, the buffer is freed when all consumers have finished using the value. These intermediate buffers are the only data buffering in the fabric, outside of internal FU state. The NoC, which forwards data to dependent PEs, is entirely bufferless.

SNAFU uses a standardized interface 106 for interaction between a PE's µcore 302 and FU 308. The standard interface 106 has four control signals and several data signals. The four controls signals are op, ready, valid and done. The µcore 302 drives op and FU 308 is responsible for driving the latter three. op tells FU 308 that input operands are ready to be consumed. ready indicates that FU 308 can consume new operands. valid and done are related: valid indicates that FU 308 has data ready to send over the network, and done indicates that FU 308 has completed execution. The remaining signals are data: incoming operands (a & b), predicate operands (m & d), and the output (z) of FU 308.

The standard interface 106 between FU 308 and µcore 302 allows µcore 302 to handle variable-latency logic, making the output of FU 308 available only when FU 308 completes an operation. µcore 302 raises back-pressure in the network when output from an FU is not ready and stalls the FU (by keeping op low) when input operands are not ready or when there are no unallocated intermediate buffers. When FU 308 asserts both valid and done, µcore 302 forwards the value produced by FU 308 to dependent PEs via its NoC router.

The fabric has a top-level controller that interfaces with each µcore 302 via three 1-bit signals. The first enables µcore 302 to begin execution, the second resets µcore 302, and the third tells the controller when the PE has finished processing all input. µcore 302 keeps track of the progress of FU 308 by monitoring the done signal and counting how many elements FU 308 has processed. When the number of completed elements matches the length of the computation, µcore 302 signals the controller that it is done.

SNAFU supports conditional execution through built-in support for vector predication. µcore 302 delivers to FU 108 not only the predicate m, but also a fallback value d which is delivered when the predicate is false. When the predicate is true, FU 308 executes normally; when it is false, FU 308 is still triggered so that it can update its internal state (e.g., memory index for a strided load), but the fallback value is passed through.

µcfg 304 handles processing element configuration, setting up a PE's dataflow routes and providing a custom FU configuration state. Router configuration maps inputs (a,b,m & d) to a router port. µcfg 304 forwards the custom FU configuration directly to FU 308, which SNAFU assumes handles its own internal configuration. The µcfg 304 module contains a configuration cache that can hold up to six different configurations. The cached configurations reduce memory accesses and allow for fast switching between configurations. This improves both energy-efficiency and performance. It also benefits applications with dataflow graphs too large to fit onto the fabric. These applications split their dataflow graph into multiple sub-graphs. The CGRA executes them one at a time, efficiently switching between them via the configuration cache. Note, however, that even with the configuration cache, each fabric configuration is intended to be re-used across many input values before switching, unlike prior CGRAs that multiplex configurations cycle-by-cycle (Sec. II).

PE Library-SNAFU includes a library of PEs that have been developed using the standard interface 106. The library includes four types of PEs: a basic ALU, multiplier, memory (load/store) unit, and scratchpad unit.

There are two types of arithmetic PEs: the basic ALU and the multiplier. The basic ALU performs bitwise operations, comparisons, additions, subtractions, and fixed-point clip operations. The multiplier performs 32-bit signed multiplication. Both units are equipped with the ability to accumulate partial results, like PE #4 (vredsum) in FIG. 2.

Memory PEs generate addresses and issue loads and stores to global memory. The memory PE operates in two different modes, supporting strided access and indirect access. The memory PE also includes a "row buffer," which eliminates many subword accesses on accesses to a recently-loaded word.

A scratchpad PE holds intermediate values produced by the CGRA. The scratchpad PE is especially useful forholding data communicated between consecutive configurations of a CGRA (e.g., when the entire dataflow graph is too large for the CGRA). The scratchpad PE connects to a 1 KB SRAM memory that supports stride-one and indirect accesses. Indirect access is used to implement permutation, allowing data to be written or read in a specified, permuted order.

Generating a CGRA Fabric—Given a collection of processing elements, SNAFU automatically generates a complete energy-minimal CGRA fabric. SNAFU ingests a high-level description of the CGRA topology and generates valid RTL. This high-level description includes a list of the processing elements, their types, and an adjacency matrix that encodes the NoC topology. With this high-level description, SNAFU generates an RTL header file. The file is used to parameterize a general RTL description of a generic, energy-minimal CGRA fabric, which can then be fed through standard CAD tools.

SNAFU generates a NoC using a parameterized bufferless router model. The router can have any input and output radix and gracefully handles network back-pressure. Connections between inputs and outputs are configured statically for each configuration. Routers are mux-based because modern CAD tools optimize multiplexors.

Following RTL generation, SNAFU fabrics can be synthesized through standard CAD tools from the top down without manual intervention. Top-down synthesis is important because SNAFU's bufferless, multi-hop NoC introduces combinational loops that normally require a labor-intensive, bottom-up approach to generate correct hardware. Industry CAD tools have difficulty analyzing and breaking combinational loops (i.e., by adding buffers to disable the loops). SNAFU synthesizes CGRAs (which face the problem with combinational loops in their bufferless NoCs) from the top down to automate this process. SNAFU partitions connections between routers and PEs and uses timing case analysis to eliminate inconsequential timing arcs. SNAFU is the first framework for top-down synthesis of a CGRA, eliminating the manual effort of bottom-up synthesis.

Compilation—The final component is a compiler that targets the generated CGRA fabric. FIG. 2 shows the compilation flow from vectorized code to valid CGRA configuration bitstream. The compiler first extracts the dataflow graph from the vectorized C-code. SNAFU asks the system designer (not the application programmer) to provide a mapping from RISC-V vector ISA instruction to a PE type, including the mapping of an operation's inputs and output onto an FU's inputs and output. This mapping lets SNAFU's compiler seamlessly support new types of PEs.

The compiler uses an integer linear program (ILP) formulation to schedule operations onto the PEs of a CGRA. The scheduler takes as input the extracted dataflow graph, the abstract instruction PE map, and a description of the CGRA's network topology. The scheduler's ILP constraint formulation builds on prior work on scheduling code onto a CGRA. The scheduler searches for subgraph isomorphisms between the extracted dataflow graph and the CGRA topology, minimizing the distance between spatially scheduled operations. At the same time, the ILP adheres to the mappings in the abstract instruction PE map and does not map multiple dataflow nodes or edges to a single PE or route. To handle PEs that are shared across multiple fabric configurations (e.g., scratchpads holding intermediate data), programmers can annotate code with instruction affinity, which maps a particular instruction to a particular PE.

Scheduling onto a CGRA fabric is an extremely challenging problem, limiting compiler scalability to small kernels. However, this is not the case for SNAFU's compiler because SNAFU's hardware makes compilation much easier: SNAFU supports asynchronous dataflow firing and does not time-multiplex PEs or routes. Together, these properties mean that the compiler need not reason about operation timing, making the search space much smaller and simplifying its constraints. As a result, SNAFU's compiler can find an optimal solution in seconds even for the most complex kernels that we have evaluated.

If a kernel is too large to fit onto the CGRA or there is resource mismatch between the kernel and the fabric, the tool relies on the programmer to manually split the vectorized code into several smaller kernels that can be individually scheduled. This is a limitation of the current implementation, but not fundamental; a future version of the compiler will automate this process.

Goal: Minimizing Energy

SNAFU's design departs from prior CGRAs because it is designed from the ground-up to minimize energy. This difference is essential for emerging ULP applications, and it motivates several key features of SNAFU's CGRA architecture. This section explores these differences and explains how they allow SNAFU to minimize energy.

Spatial Vector-Dataflow Execution—The state-of-the-art in ULP architecture is MANIC. As discussed herein MANIC introduces vector-dataflow execution, which amortizes instruction fetch, decode, and control (vector) and forwards intermediate values between instructions (dataflow). MANIC's vector-dataflow implementation parks intermediate values in a small "forwarding buffer," instead of the large vector register file (VRF).

MANIC reduces energy and adds negligible area, but its savings are limited by two low-level effects that only become apparent in a complete implementation. First, compiled SRAMs are cheaper and scale better than suggested by high-level architectural models. (i.e., MANIC's savings from reducing VRF accesses are smaller than estimated). Second, MANIC multiplexes all instructions onto a shared execution pipeline, causing high switching activity in the pipeline logic and registers as control and data signals toggle cycle-to-cycle. Both effects limit MANIC's energy savings.

SNAFU reduces energy by implementing spatial vector-dataflow execution. Like vector-dataflow, SNAFU's CGRA amortizes a single fabric configuration across many computations (vector), and routes intermediate values directly between operations (dataflow). But SNAFU spatially implements vector-dataflow: SNAFU buffers intermediate values locally in each PE (vs. MANIC's shared forwarding buffer) and each PE performs a single operation (vs. MANIC's shared pipeline). Note that this design is also a contrast with prior CGRAs, which share PEs among multiple operations to increase performance and utilization.

As a result, SNAFU reduces both effects that limit MANIC's energy savings. The reduction in switching activity accounts for the majority of the ~41% of energy savings that SNAFU achieves vs. MANIC. The downside is that SNAFU takes significantly more area than MANIC. This tradeoff is worthwhile because ULP systems are tiny and most area is occupied by memory and I/O. SNAFU's leakage power is negligible despite its larger area because we use a high-threshold-voltage process.

Asynchronous Dataflow Firing Without Tag-Token Matching—The rest of this section discusses how SNAFU differs from prior CGRAs, starting with its dynamic dataflow firing.

Prior CGRAs have explored both static and dynamic strategies to assign operations to PEs and to schedule operations. Static assignment and scheduling is most energy-efficient, whereas fully dynamic designs require expensive tag-matching hardware to associate operands with their operation. A static design is feasible when all operation latencies are known and a compiler can find an efficient global schedule. Static designs are thus common in CGRAs that do not directly interact with a memory hierarchy.

SNAFU is designed to easily integrate new FUs with unknown or variable latency. (e.g., a memory PE may introduce variable latency due to bank conflicts). A fully static design is thus not well-suited to SNAFU, but SNAFU cannot afford full tag-token matching either. SNAFU's solution is a hybrid CGRA with static PE assignment and dynamic scheduling. ("Ordered dataflow" in the taxonomy of the art). Each PE uses local, asynchronous dataflow firing to tolerate variable latency. SNAFU avoids tag-matching by enforcing that values arrive in-order. This design lets SNAFU integrate arbitrary FUs with little energy or area overhead, adding just 2% system energy to SNAFU-ARCH. The cost of this design is some loss in performance vs. a fully dynamic CGRA. Moreover, asynchronous firing simplifies the compiler, as discussed above, because it is not responsible for operation timing.

Statically Routed, Bufferless On-Chip Network—The on-chip network (NoC) can consume a large fraction of energy in high-performance CGRAs (e.g., more than 25% of fabric energy). Buffers in NoC routers are a major energy sink, and dynamic, packet-switched routers cause high switching activity. Prior ULP CGRAs avoid this cost with highly restrictive NoCs that limit flexibility.

SNAFU includes a statically-configured, bufferless, multi-hop on-chip network designed for high routability at minimal energy. Static circuit-switching eliminates expensive lookup tables and flow-control mechanisms. Such static routing does not degrade performance. The network is bufferless (a PE buffers values it produces, eliminating the NoC's primary energy sink (e.g., half of NoC energy or more). As a result, SNAFU's NoC takes just 6% of system energy.

Minimizing Buffers in the Fabric—Buffering of intermediate values in prior CGRAs: Prior CGRAs maximize performance by forwarding values to dependent PEs and buffering them in large FIFOs, freeing a producer PE to start its next operation as early as possible. If a dependent PE is not ready, the NoC or dependent PE may buffer values. This approach maximizes parallelism but duplicates intermediate values unnecessarily.

SNAFU includes minimal in-fabric buffering at the producer PE, with none in the NoC. Buffering at the producer PE means each value is buffered exactly once and overwritten only when all dependent PEs are finished using it. In SNAFU-ARCH, producer-side buffering saves 7% of system energy versus consumer-side buffering. The cost is that a producer PE may stall if a dependent PE is not ready. SNAFU minimizes the number of buffers at each PE, using just four buffers per PE by default.

SNAFU-ARCH: A Complete ULP System Using CGRA

SNAFU-ARCH is a complete ULP system that includes a CGRA fabric generated by SNAFU integrated with a scalar RISC-V core and memory.

Figure 4:
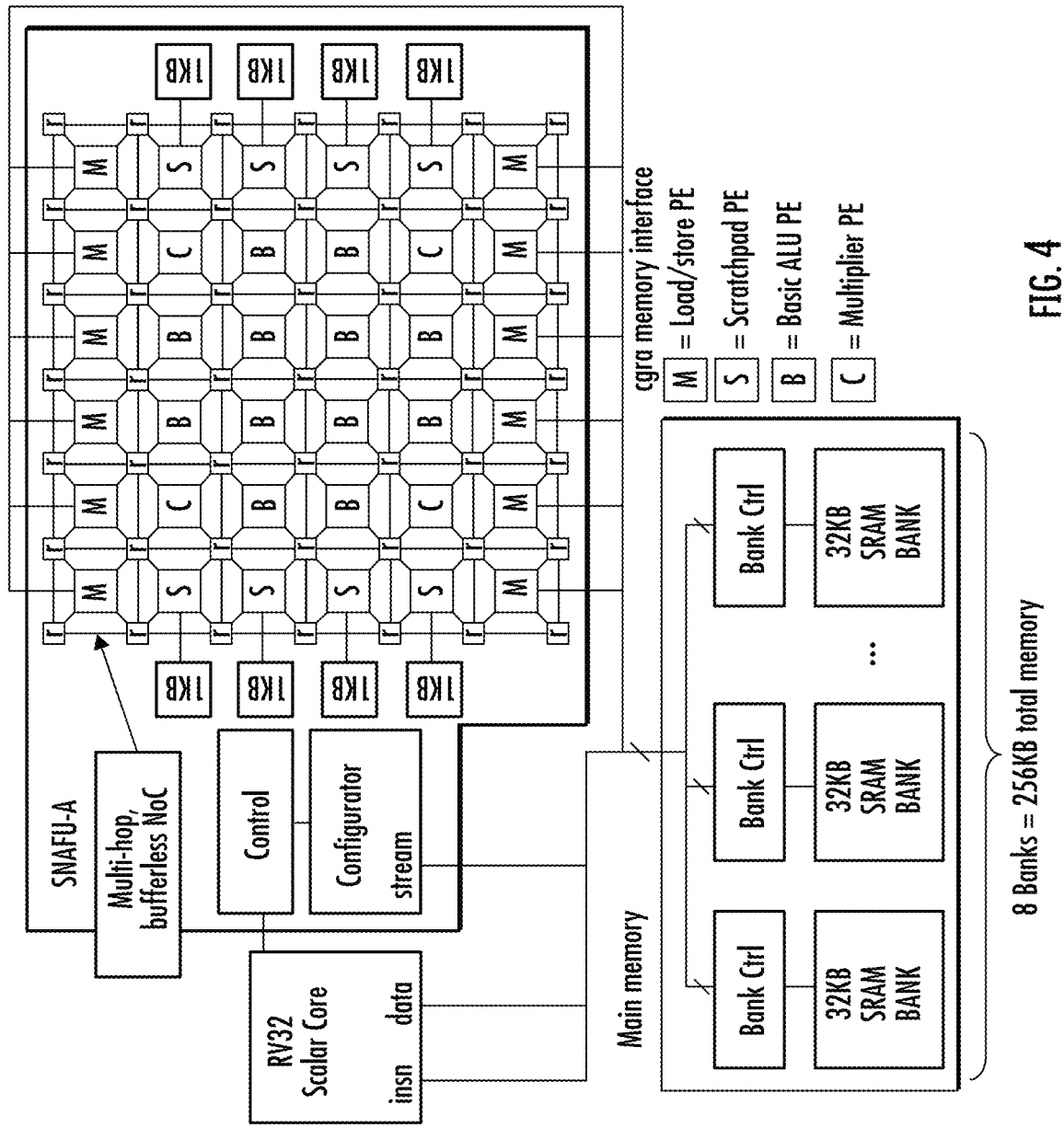
FIG. 4 is a block diagram of an exemplary embodiment of a CGRA implemented using SNAFU.

Architectural Overview—FIG. 4 shows an overview of the architecture of SNAFU-ARCH. There are three primary components: a RISC-V scalar core, a banked memory, and the SNAFU fabric. The SNAFU fabric is tightly coupled to the scalar core. It is a 6×6 mesh possessing 12 memory PEs, 12 basic-ALU PEs, 8 scratchpad PEs, and 4 multiplier PEs. The RTL for the fabric is generated using SNAFU and the mesh topology shown. The memory PEs connect to the banked memory, while the scratchpad PEs each connect to 1 KB outside the fabric.

The RISC-V scalar core implements the E, M, I, and C extensions and issues control signals to the SNAFU fabric. The banked memory has eight 32 KB memory banks (256 KB total). In total there are 15 ports to the banked memory: thirteen from the SNAFU fabric and two from the scalar core. The twelve memory PEs account for the majority of the ports from the fabric. The final port from the fabric allows the SNAFU configurator to load configuration bitstreams from memory. Each bank of the main memory can execute a single memory request at a time; its bank controller arbitrates between requests using a round-robin policy to maintain fairness, so that all requests are eventually serviced.

Example of SNAFU-ARCH in Action—SNAFU-ARCH adds three instructions to the scalar core to interface with the CGRA fabric. The following example explains how they work.

The SNAFU fabric operates in three states: idle, configuration, and execution. During the idle phase the scalar core is running and the fabric is not. When the scalar core reaches a µcfg instruction, the fabric transitions to the configuration state. The scalar core passes a vector length and a bitstream address (from the register file) to the fabric configurator, as shown in FIG. 4. The configurator checks to see if this configuration is still in the fabric's configuration cache. If it is, the configurator broadcasts a control signal to all PEs and routers to load the cached configuration, otherwise, it loads the configuration header from memory. The header tells the configurator which routers and which PEs are active in the configuration. Then the configurator issues a series of loads to read in configuration bits for the enabled PEs and routers.

Once this has completed, the configurator stalls until the scalar core either reaches a vtfr instruction or a vfence instruction. vtfr lets the scalar core pass a register value to the fabric configurator, which then passes that value to a specific PE (encoded in the instruction). This allows PEs to be further parameterized at runtime from the scalar core. vfence indicates that configuration is done, so the scalar core stalls and the fabric transitions to execution. Execution proceeds until all PEs signal that they have completed their work. Finally, the scalar core resumes execution from the vfence, and the fabric transitions back into the idle state.

A framework for generating ultra-low-power CGRAs has been presented herein. SNAFU maximizes flexibility while minimizing energy. It takes a bring your own functional unit approach, allowing easy integration of custom logic, and it minimizes energy by aggressively favoring efficiency over performance throughout the design. SNAFU was used to generate SNAFU-ARCH, a complete ULP CGRA system that uses ~41% less energy and is ~4.4 faster than the prior state-of-the-art general-purpose ULP system. Moreover, SNAFU-ARCH is competitive with ASICs and can be incrementally specialized to trade off efficiency and programmability.

The invention claimed is:

1. A system for generating a hardware design for a coarse-grain reconfigurable array comprising:
   a processor; and
   generation software, for execution by the processor, the generation software performing the functions of:
      taking as input a library of processing elements, one or more customized processing elements and a high-level description of the coarse-grain reconfigurable array; and
      generating a hardware description of the coarse-grain reconfigurable array comprising a plurality of processing elements connected by a network;
      wherein each processing element in the library and each of the one or more customized processing elements has a standard interface;
      wherein the network is a bufferless on-chip network; and wherein the customized processing elements comprise custom functional units that use the standard interface and that add custom, user-supplied logic to the generated coarse-grain reconfigurable array.

2. The system of claim 1 wherein each of the processing elements described by the hardware description buffers one or more outputs of the processing element within the processing element.

3. The system of claim 2 wherein each of the processing elements has one or more inputs and further wherein at least some of the one or more inputs is retrieved from an output buffer of another processing element.

4. The system of claim 3 wherein each processing element comprises:
a core module for handling progress tracking of the processing element, predicted execution of the processing element and communication;
a functional unit comprising logic for performing a specific function; and
a configuration module for configuring or reconfiguring the core and the functional unit.

5. The system of claim 4 wherein the core handles communication between the functional unit and the network.

6. The system of claim 5 wherein the core comprises:
an input router;
logic tracing the state of operands; and
one or more buffers for holding outputs of the functional unit.

7. The system of claim 6 wherein outputs of a functional unit are held in buffers until all other processing elements requiring the outputs as an input have retrieved the value and further wherein the buffer is freed thereafter.

8. The system of claim 4 wherein the configuration module performs the functions of:
configuring dataflow routes for the processing element; and
configuring an initial state of the functional unit.

9. The system of claim 3 wherein the standard interface is between the functional unit and the core.

10. The system of claim 9 wherein the standard interface comprises a set of control signals and a set of data signals.

11. The system of claim 10 wherein the set of control signal comprises:
an op signal, set by the core, indicating that inputs are ready to be consumed;
a ready signal, set by the functional unit, indicating that the functional unit is ready to consume more inputs;
a valid signal, set by the functional unit, indicating that the functional unit has data ready to be sent over the network; and
a done signal, set by the functional unit, indicating that the functional unit has completed execution.

12. The system of claim 11 wherein, when the functional unit asserts both the valid and done signals, the core forwards outputs of the functional unit to other, processing elements which are dependent on the outputs of the functional unit.

13. The system of claim 10 wherein the set of data signals comprises:
a predicate value; and
a fallback value;
wherein, when the core asserts the predicate, the functional unit is triggered and executes normally; and
wherein, when the predicate is not asserted, the functional unit is triggered, but returns the fallback value as an output.

14. The system of claim 1 wherein the hardware description further comprises a top-level controller that interfaces with each of the plurality of processing elements.

15. The system of claim 1 wherein each processing element in the library is selected from a group consisting of arithmetic processing elements, memory processing elements and scratchpad processing elements.

16. The system of claim 15 wherein each arithmetic processing element comprises either a basic arithmetic processing unit implementing bitwise operations, comparisons, additions, subtractions and fixed-point clip operations or a multiplier implementing 32-bit signed multiplication.

17. The system of claim 1 wherein the hardware description is generated in register transfer logic.

18. The system of claim 1 further comprising:
compiler software, for execution by the processor, the compiler software performing the functions of:
taking as input vectorized code and a mapping between vector operations and processing elements, including a mapping of the inputs of the vector operations to inputs of a functional unit;
extracting a dataflow graph from the vectorized code;
scheduling vector operations onto processing elements using the extracted dataflow graph, the mapping of the inputs of each vector operation and the high-level description of the coarse-grain reconfigurable array.

19. The system of claim 18 wherein each processing element performs a single operation during execution of the vectorized code.

20. The system of claim 18 wherein the compiler implements spatial vector-dataflow execution.

* * * * *